United States Patent [19]

Miller et al.

[11] Patent Number: 5,787,650
[45] Date of Patent: *Aug. 4, 1998

[54] FLAT FLOOR SLIDE OUT APPARATUS FOR EXPANDABLE ROOMS

[75] Inventors: Mahlon A. Miller, Nappanee; David A. Blosser, Middlebury; Stanley L. Yoder, Etna Green, all of Ind.

[73] Assignee: Newmar Corporation, Nappanee, Ind.

[*] Notice: The term of this patent shall not extend beyond the expiration date of Pat. No. 5,491,933.

[21] Appl. No.: 602,507

[22] Filed: Feb. 20, 1996

Related U.S. Application Data

[63] Continuation-in-part of Ser. No. 308,971, Sep. 20, 1994, Pat. No. 5,491,933.

[51] Int. Cl.$^6$ ............................................. B60P 3/34
[52] U.S. Cl. .......................... 52/67; 52/143; 296/26; 296/165; 296/171; 296/175
[58] Field of Search ................... 52/67, 143; 296/171, 296/172, 173, 175, 176, 165, 26

[56] References Cited

U.S. PATENT DOCUMENTS

| | | | |
|---|---|---|---|
| 1,279,819 | 9/1918 | Zingsheim et al. | 52/67 |
| 1,521,635 | 1/1925 | Lewis | 52/67 |
| 2,136,130 | 11/1938 | Gorlenko | 52/67 X |
| 2,704,223 | 3/1955 | Houdart | 296/175 X |
| 2,813,747 | 11/1957 | Rice, Jr. | 296/171 |
| 5,090,749 | 2/1992 | Lee | 296/171 |
| 5,237,782 | 8/1993 | Cooper | 296/171 X |
| 5,332,276 | 7/1994 | Blodgett, Jr. | 296/171 X |
| 5,333,420 | 8/1994 | Eden | 52/67 |
| 5,491,933 | 2/1996 | Miller et al. | 52/67 |
| 5,577,351 | 11/1996 | Dewald, Jr. et al. | 296/171 X |
| 5,620,224 | 4/1997 | DiBiagio et al. | 296/171 X |

*Primary Examiner*—Wynn Wood Coggins
*Assistant Examiner*—Laura A. Callo
*Attorney, Agent, or Firm*—Ryan M. Fountain

[57] ABSTRACT

An expandable room structure is provided having relatively movable room portions supported by telescopically sliding tubes, at least one of those tubes being movable also laterally to pivot as the room portion floors slide into the same horizontal plane when the room structure is moving into expanded positions. In retracted positions the room portion floors are vertically spaced to permit one room portion to nest within the other. A rack and pinion drive arrangement is provided to cause relative movement between the tubes. Selective lateral movement of one of the tubes is permitted by engagement with an adjustably inclined surface extending out of the other tube such that the laterally moving tube pivots about the pinion to a desired degree. A ramp surface is formed on the abutting edge of the floor of one room portion, and the abutting edge of the floor of the other room portion moves up and down that ramp portion when transitioning between expanded and retracted positions. When moving to expanded positions, such movement down the ramp occurs prior to pivoting of the sliding tube(s), such that end wall weather sealing is pivotably clamped without vertical sliding.

8 Claims, 11 Drawing Sheets

FIG. 12 tion Ser. No. 08/308,971, filed on Sep. 20, 1994, issued on Feb. 20, 1996 as U.S. Pat. No. 5,491,933 and assigned to the same assignee as the present application, namely Mahlon A. Miller.

FLAT FLOOR SLIDE OUT APPARATUS FOR EXPANDABLE ROOMS

BACKGROUND AND SUMMARY OF THE INVENTION

The present application is a continuation in part of U.S. patent application Ser. No. 08/308,971, filed on Sep. 20, 1994, issued on Feb. 20, 1996 as U.S. Pat. No. 5,491,933 and assigned to the same assignee as the present application, namely Mahlon A. Miller.

The present invention relates generally to expandable rooms for habitable accommodations in static structures and vehicles. More particularly, this invention relates to room structures that are telescopically slidable between retracted and expanded positions.

Various motorized and towable vehicles are known which have rooms or portions thereof that can be adjusted between expanded and retracted positions in order to provide more or less internal accommodation, respectively, as desired by the user. In a typical structure, one portion of the room is movable and telescopically received or nested within a portion of the room that remains fixed. Similar structures can be used effectively in buildings, although for convenience the discussion below focusses primarily on the vehicular examples.

When the vehicle, a Class A motor home, for example, is in motion the room remains in a retracted position. As such, there is typically adequate space within the room to accommodate users in transit and remain within the standard width limitations imposed upon motor vehicles. When the motor home is stopped for a length of time, however, it is often desirable to increase the size of internal accommodations. At that point users can slide the nested room portion out to its fully expanded position.

These movable room portions usually include a floor, a roof, a side wall and one or more end walls. In the retracted positions, the roof and end walls are typically concealed from exterior view and the room side wall forms a portion of the vehicle side wall. At the same time, the floor of the movable portion of the room typically rests above the floor of that portion of the room which remains fixed, and may form a portion of the usable interior floor during vehicle transit. Similarly, the ceiling of the movable roof portion may define the interior ceiling of that part of the vehicle during transit.

However, since the movable portion of the room is nested within the fixed portion of the room, the movable portion usually has at least some smaller dimensions than the fixed portion. Thus, when the movable portion is in expanded positions it is not uncommon for the floor of the movable portion to be higher than the floor of the fixed portion and for the ceiling of the movable portion to be lower than the ceiling of the fixed portion. Unfortunately, such stepped flooring has frequently been found to be undesirable, inconvenient and somewhat hazardous.

For example, due to the slight height difference of the step between floor portions, it can be overlooked by users and cause tripping or stumbling if care is not taken. Further, that step limits the freedom of movement of furniture within the room. Also, the step makes it more difficult to create an aesthetically pleasing floor appearance.

In response, certain slide out room structures have been suggested which permit the floor sections to have a flush upper surface in at least some expanded positions. Unfortunately, such structures can be overly complicated, expensive and relatively heavy. These can be serious drawbacks. In the vehicular environment, unnecessary slide mechanism weight cuts down on fuel economy when the vehicle is in transit. Also, vehicular structures often need to have greater insensitivity to vibration. Further, expandable or slide out rooms are commonly employed in recreational vehicles. As such, reliability, ease of operation and minimal cost are important factors in marketing of the vehicle.

Also, some of these prior room structures have been found to have deficiencies in the weather sealing between the room portions. Since recreational vehicles are often used during inclement weather, defective weather sealing is a significant matter. It is believed that the weather sealing problems of certain prior movable room structures arise because the method of room movement involves first fully extending the movable room portion and then lowering the movable floor portion into alignment with the fixed floor portion. In doing so, the weather sealing strips often placed on the movable end walls first fully engage the receiving end walls of the fixed portion of the room and are then slid downwardly as the floors are made flush. Unfortunately, this downward sliding can damage the weather sealing strips and/or cause the sealing integrity to be reduced.

In designing an improved slide out mechanism for movable rooms, several other factors should be considered as well. For example, as the room expands, misalignment of the movable room portion can cause the end walls to bind together. This misalignment concern increases as the length of the movable room increases and as multiple slide support structures are employed to move the room portion. Further, as the width of the room and/or the extension distance out from the vehicle increases, the cantilevering forces exerted on the slide mechanism tend to cause sagging of the overall movable side wall. As a result, there is a tendency for the floor portions to separate at their abutting edges.

Also, since for safety reasons and convenience the room portions typically need to be locked in place against unintentional movement once in the expanded and retracted positions, the slide out mechanism should not interfere with or preclude ease of using the locking mechanism. Alternatively, the slide out mechanism should be designed such that a convenient and inexpensive adaptation for conventional locking mechanisms, and like accessories, should be available to accommodate use of the slide out mechanism. In addition, since primary drive devices for the slide out mechanism, such as electric motors, will after time wear out, an easily available back up or emergency drive device should be included.

Further, for ease of manufacturability and minimizing manufacturing costs, the slide out mechanism should be adapted for use with conventional materials and manufacturing methods. For example, depending upon the cantilevered distance that the expandable room extends beyond its support on the vehicle frame, most frame or underlying support elements constructed from conventional materials and with conventional assembly methods will exhibit a certain degree of sag or vertical drop from the intended horizontal of the support elements themselves. Moreover, conventional manufacturing methods typically permit some minor dimensional variance between each unit constructed, even of the same type. Again, if the outward extension of the room is long enough this could result in a perceptible difference in the degree of sag between the expandable rooms of different vehicles of the same type. Accordingly, the slide out mechanism should accommodate the sag variance without significant loss of uniformity in floor leveling.

Accordingly, it is an object of this invention to provide an improved expandable room structure. Further objects include the provision of an expandable room structure that:

A. is relatively inexpensive to manufacture and reliable in use,
B. is of minimal weight and maintains sliding alignment against end wall binding,
C. creates a flush overall floor in expanded positions,
D. includes an easily accessible back up drive arrangement,
E. is durable and convenient to use in vehicles,
F. maintains effective weather sealing,
G. accommodates normal manufacturing variances between units without significant loss of uniformity in finished appearance, and
H. minimizes necessary adaptation of conventional accessory products.

These and other objects of the present invention are obtained by the provision of an expandable room structure having relatively movable room portions supported by telescopically sliding tubes, at least one of those tubes being movable also laterally to varying degrees in order to pivot as the room portion floors slide into the same horizontal plane when the room structure is moving into expanded positions. In retracted positions the room portion floors are vertically spaced to permit one room portion to nest within the other. A rack and pinion drive arrangement is provided to cause relative movement between the tubes. Selective lateral movement of one of the tubes is permitted by engagement with an adjustably inclined surface extending out of the other tube such that the laterally moving tube pivots about the pinion to desired degree. A ramp surface is formed along the abutting edge of the floor of one room portion, and the abutting edge of the floor of the other room portion moves up and down that ramp surface when transitioning between expanded and retracted positions. When moving to expanded positions, such movement down the ramp surface occurs prior to pivoting of the sliding tube(s), such that end wall weather sealing is pivotably clamped substantially without vertical sliding.

Especially for longer room structures, a plurality of such sets of telescopically sliding tubes can be used in cooperation to avoid end wall binding. A common cross shaft is joined to the pinions of the drive arrangements of each set, and a drive motor is connected to that cross shaft. Also, a keyed surface can be formed on the cross shaft to permit manual driving force to be applied.

Other objects, advantages and novel features of the present invention will now be readily apparent to those of still in the pertinent art from the following drawings and detailed description.

DESCRIPTION OF PREFERRED EMBODIMENTS

Figure 1:
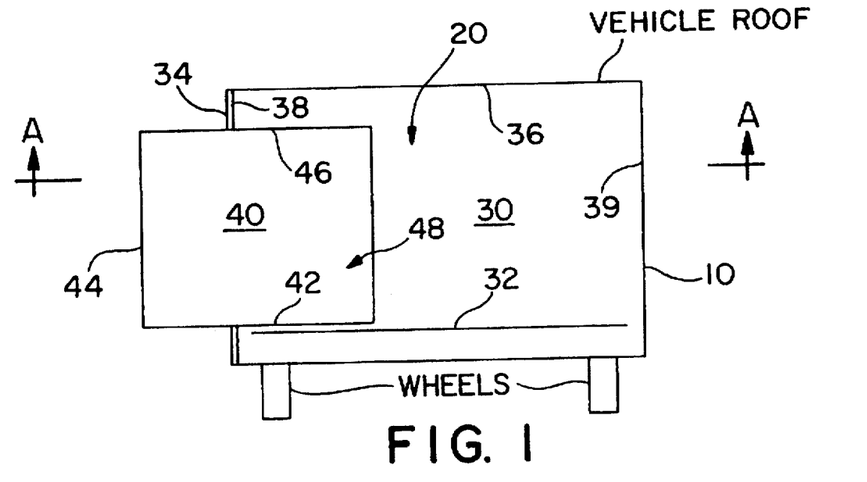
FIG. 1 shows schematically a cross sectional front end view of a vehicle having an expandable room according to the teachings of the present invention when the room is in a partially retracted position.

The figures described above show preferred embodiments of the present invention as mounted in a typical vehicle, such as a Class A motor home or like motorized or towable recreational vehicle. The view of FIG. 1 is from the front of the vehicle looking to the rear, with the slide out room mounted for expansion on the left side of the vehicle. The present invention is not, however, limited to such arrangements, and has applicability, for example, to slide out rooms mounted for expansion on the right side or rear of the vehicle. Similarly, this invention is suitable as well for use in static structures, such as buildings, even though the preferred embodiments described herein are explicitly for vehicular applications.

Vehicle 10 includes slide out or expandable room structure 20 having first room portion 30 and second room portion 40. Room structure 20 is typically placed in a middle region along the length of the vehicle and forms a living and/or dining room area. Room portion 30 is, for example, fixed or stationary relative to vehicle 10, and room portion 40 is movable relative to vehicle 10 and room portion 30. In retracted positions, room portion 40 is telescopically received or nested within room portion 30. In expanded positions, room portion 40 extends outwardly from room portion 30 in a cantilevered manner. The present invention provides a means for obtaining a flush floor within room structure 20 when room portion 40 is in expanded positions.

Room structure 30 includes first floor section 32, side wall sections 34, roof section 36 and end wall sections 38. In FIGS. 1–6, only a single side wall and end wall section are shown. It will be understood from FIG 1A, however, that another set of such walls is formed on the opposite side of the opening made in vehicle 10 to receive room portion 40. Side wall sections 34 preferably form part of the exterior sides of the vehicle. End wall sections 38 extend inwardly from side wall sections 34 and define a stop to the expansion movement of room portion 40. To achieve the maximum width of room structure 20 in expanded positions, the inward length of end wall sections 38 can be minimal. In especially preferred embodiments that length is nominal, and end wall sections 38 serve only to define the portion adjacent to or integral with side wall 34 upon which the weather sealing strips are mounted and/or in abutment Room portion 40 includes second floor section 42, side wall section 44, roof section 46 and end wall sections 48. Again, in FIGS. 1–6 only a single end wall section 48 is shown, but it will be understood from FIG. 1A that such an end wall section is formed on each end of side wall section 44. These end wall sections extend inwardly to close side wall section 44 with side wall sections 34 when room portion 40 is in expanded positions. Thus, the inward length of end wall sections 48 define the limit of expansion of room portion 40. To achieve the maximum width of room structure 20, the inward length of end wall sections 48 can be maximized up to the point where those walls interfere with structure on the inside of vehicle 10 opposite side wall section 44 (such as cabinets, sinks, wall 39 or the like). However, in especially preferred embodiments where the vehicle is to be occupied when room portion 40 is in retracted positions, the inward length of end wall sections 48 is not maximized. Instead, a balance is achieved by making the inward length as large as it can be without unduly interfering with use of the vehicle interior during transit.

Figure 2:
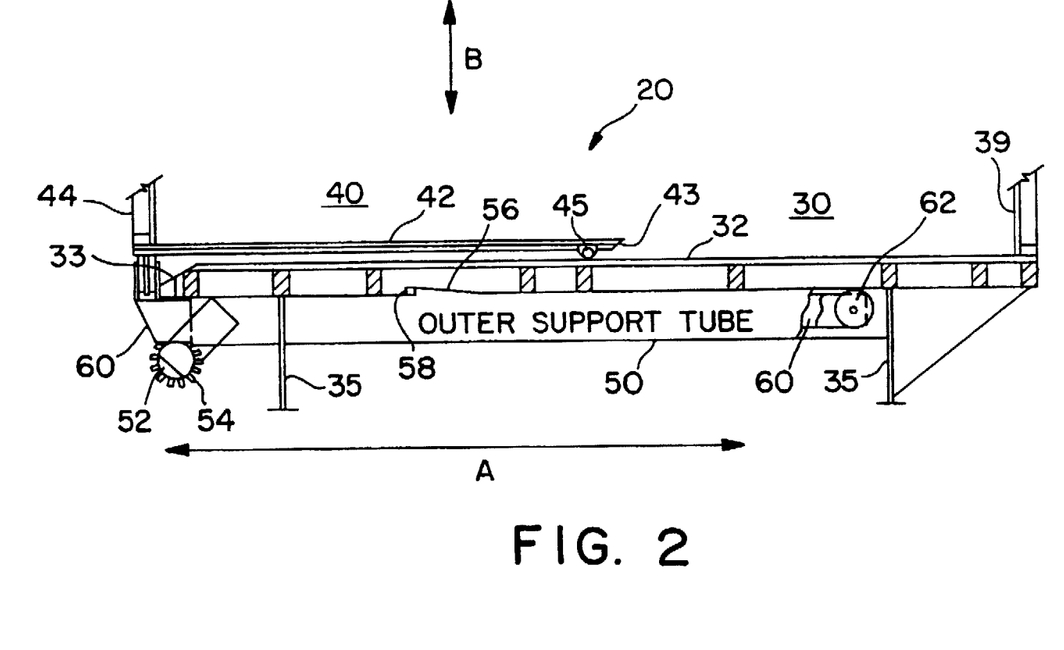
FIG. 2 shows an enlarged cross sectional front view of a the lower portion of the expandable room of the vehicle of FIG. 1 when that room is in a retracted position.
Figure 3:
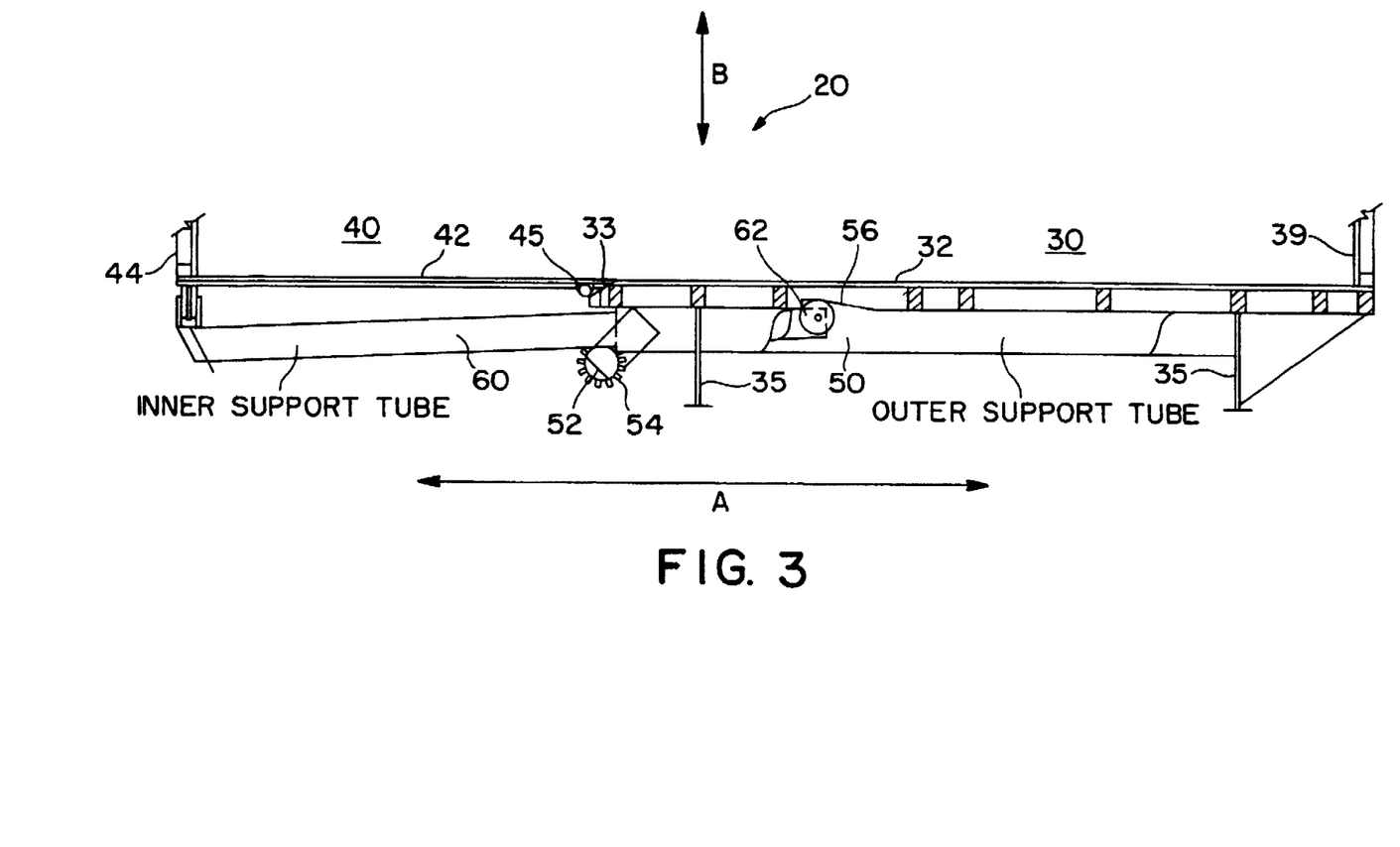
FIG. 3 shows a cross sectional front view, corresponding to that of FIG. 2, when the room is in an expanded position.

As shown especially in FIGS. 2 and 3, telescopically sliding tubes or rails are mounted under room structure 20 to provide support and control during expansion and retraction. In the embodiments shown, these tubes provide both support for room portion 40 and the actuation means for positioning that room portion. However, the present invention contemplates that in certain embodiments those functions can be achieved by separate elements.

Preferably, at least two sets of such tubes are mounted at positions spaced apart along the length of room structure 20, that length forming a portion of the length of vehicle 10. In especially preferred embodiments, these sets of tubes are aligned such that their length in longitudinal direction A is along the line of expansion and retraction of room portion 40, across the width of the vehicle. Each set of these tubes includes at least two tube elements.

A first, outer support tube 50 is, for example, fixedly mounted to the main frame or flooring beam structure 35 beneath room portion 30. A second, inner support tube 60 is slidably mounted within tube 50 and fixed at one end to room portion 40 adjacent the lower portion of side wall section 44. In this way, room portion 40 has a slidable, cantilever mounting to room portion 30.

A free rolling wheel 62 or similar device is attached to the opposite end of tube 60 and inserted within tube 50 to serve as a support roller and assist in the longitudinal sliding of tube 60 into and out of tube 50. Tube 60 is formed, for example, as a rectangular conduit and also includes a series of spaced apart openings or slots 64, preferably along its lower surface or side. In the example shown, tube 60 is dimensioned to have clearance for sliding within tube 50 and for lateral upward movement as will be described further below. However, it will be understood that other embodiments can reverse the orientation of tubes, such that tube 50 is within tube 60, especially if an open rail structure is employed.

Preferably, a rack and pinion-type drive mechanism is employed for causing relative movement between tubes 50 and 60. For example, a drive and support wheel 52 is mounted adjacent the open end of tube 50 through which tube 60 moves. This wheel has a plurality of projections or prong teeth 54 about its circumference which are dimensioned so as to be freely engagable within slots 64. Wheel 52 is positioned on tube 50 and relative to tube 60 such that teeth 54 are aligned with and inserted into slots 64. In this way, rotation of wheel 52 supports tube 60, drives the sliding movement of tube 60 and positively locates that tube within tube 50. Thus, wheel 52 also precisely locates room portion 40 with respect to room portion 30.

Tube 50 further includes an inclined ramp or surface 56 extending upwardly which functions as an outward notch in lateral direction B toward room portion 30. In especially preferred embodiments where tube 50 has a rectangular cross section, ramp 56 is formed on the upper interior surface of the tube, facing tube 60, by separating a portion of that surface from the rest of the tube. For example, tube 50 can be cut at the intersection of the side walls and top wall of the tube and then sliced across the top wall at one end of that cut (preferably that end closest to drive wheel 52) in order to permit the flap formed thereby in the top wall to be lifted upward and outward. To maintain the desired slope and upward location of the flap, a strap element 58 is welded or otherwise secured in place between the free end of the flap and the portion of tube 50 below that free end. The interior dimensions of ramp 56 are established to permit wheel 62 to roll or slide upward to strap element 58. Preferably, the lateral elevation of ramp 56 at its upper end is sufficient that strap element 58 defines the limit of travel of wheel 62 towards drive wheel 52 and the open end of tube 50.

Floor section 32 includes an inclined or sloped end region or surface 33 at the edge which abuts floor section 42 when room structure 20 is in expanded positions. This inclined surface 33 serves as a ramp to permit room portion 40 to move laterally, as it moves longitudinally, between positions where floor section 42 is above floor section 32 and positions where floor section 42 is flush with floor section 32. As used herein, when these floor sections are "flush" their top surfaces are in substantially the same plane, preferably a horizontal plane, without a noticeable elevation between them.

Floor section 42 includes, for example, mating inclined surface 43 so as to facilitate a smooth and flush abutment between the floor sections. Floor section 42 also includes at least one roller or carrier 45 mounted to the underside of that floor section to movably support room portion 40 on room portion 30 in retracted positions. Roller 45 also facilitates telescopic sliding of the room portions between expanded and retracted positions, and especially up and down inclined surface 33.

Figure 4:
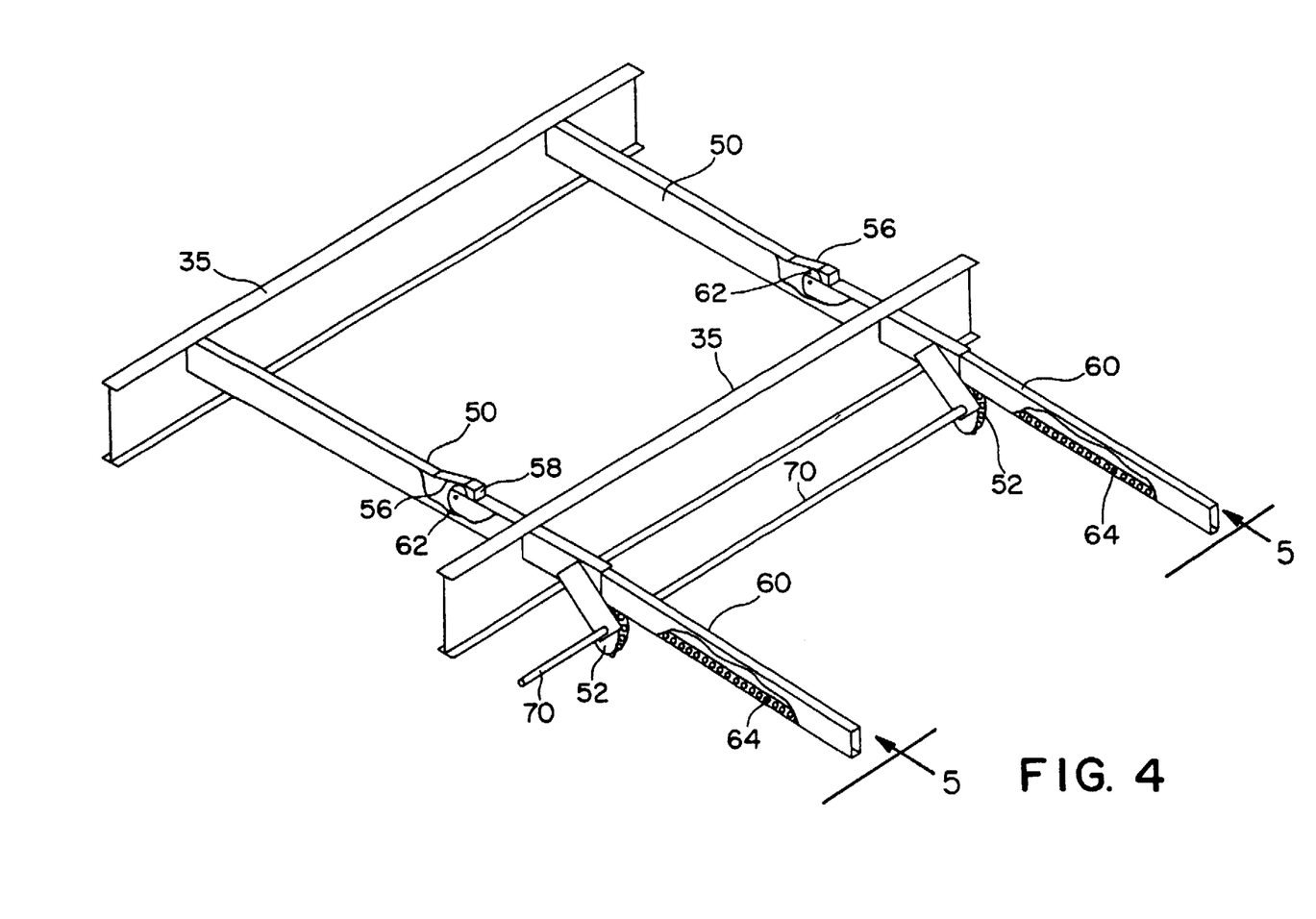
FIG. 4 shows a top, back perspective view of the room support structure of the embodiment of FIG. 2 when in an expanded position, with portions thereof broken away.
Figure 5:
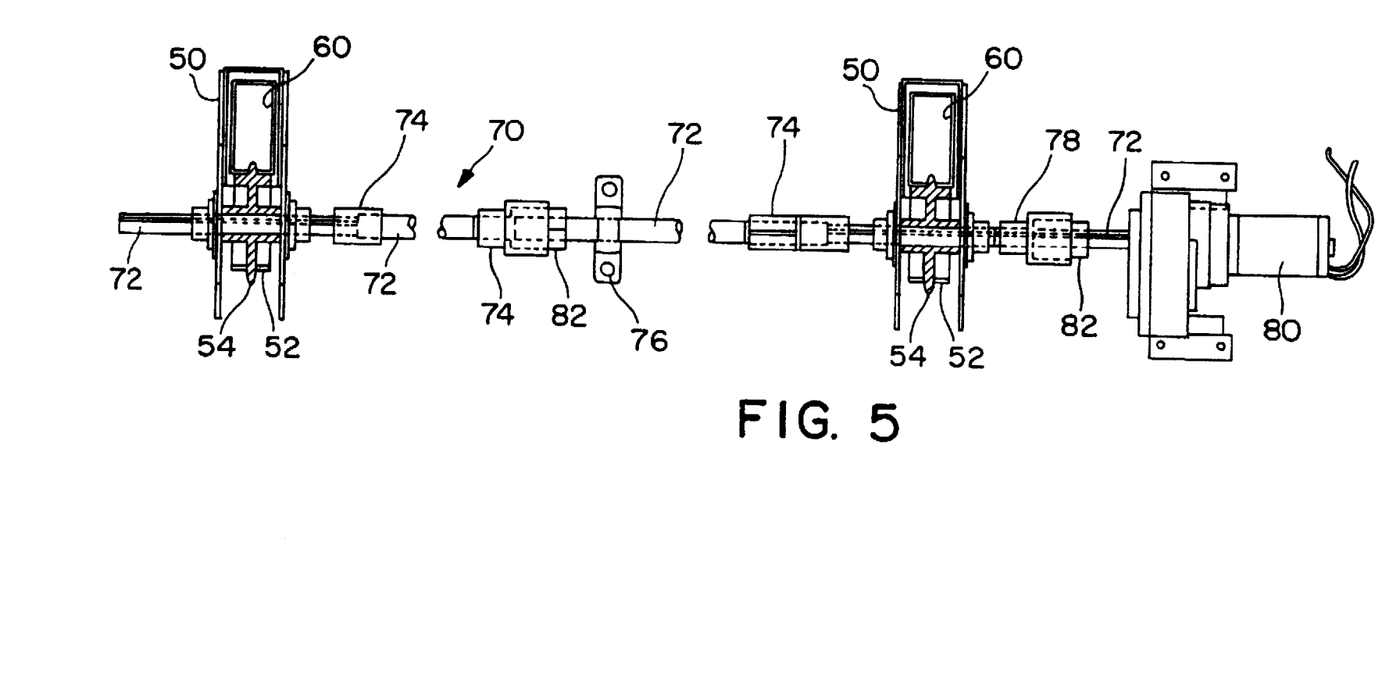
FIG. 5 shows a cross sectional side view of a specific embodiment of the support structure system of the embodiment of FIG. 2, as taken along line 5—5 of FIG. 4.

As shown especially in FIG. 4, each set of tubes 50 and 60 are connected by a cross shaft 70 joining drive wheels 52, preferably through the axis (or axes) of rotation of those drive wheels. Thus, cross shaft 70 can serve as a direct drive shaft to transmit rotational force to drive wheels 52. In this way, both sets of tubes (and, thereby, both ends of room portion 40) can be driven at the same speed. FIG. 5 shows a specific embodiment of a preferred drive shaft arrangement for that purpose. It is not, for example, necessary to employ a single rod for cross shaft 70: multiple shaft segments or rods 72 (separately or combined into drive wheels 52) can be rigidly joined by various conventional adapters or couplings 74. If it becomes important to avoid radial bending of the cross shaft in a particularly long expandable room, one or more bearings 76 can be disposed intermediate drive wheels 52 and secured to any convenient support surface. At least one motor 80 is connected through coupling 78 to cross shaft 70 as the primary drive device to provide rotational force thereto. Preferably one synchronized electric gear motor 80 is disposed on each of the two ends of the cross shaft for this purpose.

In addition, a keyed or flattened surface or adjacent bushing 82 is provided with at least one of the adapters or couplings 74 attached to cross shaft 70, preferably intermediate drive wheels 52. Keyed surface 82 is configured to mate with a common hand tool, such as a wrench, or a specially formed tool to permit the application of rotational force to the cross shaft manually, as in the case of an emergency or break down of the primary drive device. Conventional electric control circuits are, for example, connected to electric motors 80 to permit operation from inside the vehicle. Preferably, however, keyed surface 82 is located in an easily accessible region of the vehicle exterior.

In operation, after stopping the vehicle the user or operator will typically first unlock the room structure from a retracted position. Any number of conventional locking devices can be employed, although it is preferred to use a system that is compact and connects adjacent to the end wall sections inside of the vehicle. After that, electric motors 80 are actuated to cause tubes 60 to slide out of tubes 50. Since each tube 60 is being driven at the same speed, binding of the end wall sections can be avoided even in relatively long room structures. As tubes 60 continue to slide out, roller 45 moves down inclined surface 33 and wheel 62 moves up ramp 56 so that floor sections 32 and 42 can become flush in expanded positions of the room structure.

However, in preferred embodiments these movements of roller 45 and wheel 62 are in a specific sequence so as to provide proper sealing and streamlined construction. For example, ramp 56 is preferably disposed within tube 50 at a location where wheel 62 comes into contact with the ramp after most of tube 60 has slide out from tube 50. As wheel 62 moves laterally up ramp 56, tube 60 will pivot about drive wheel 52 and the end of tube 60 attached below side wall section 44 will sag downwardly. This results from the torque exerted by gravity on the cantilevered support of room portion 40. Floor section 42 is dimensioned and configured so as to be flush with floor section 32 after that pivoting or "sagging" has occurred. Therefore, prior to pivoting, floor section 42 would be slightly inclined with respect to floor section 32 because of the upthrusting effect at side wall 44 as a result of roller 45 starting to move down inclined surface 33. If this slight incline is maintained even as roller 45 continues to move down inclined surface 33 further advantage is obtained.

Figure 1A:
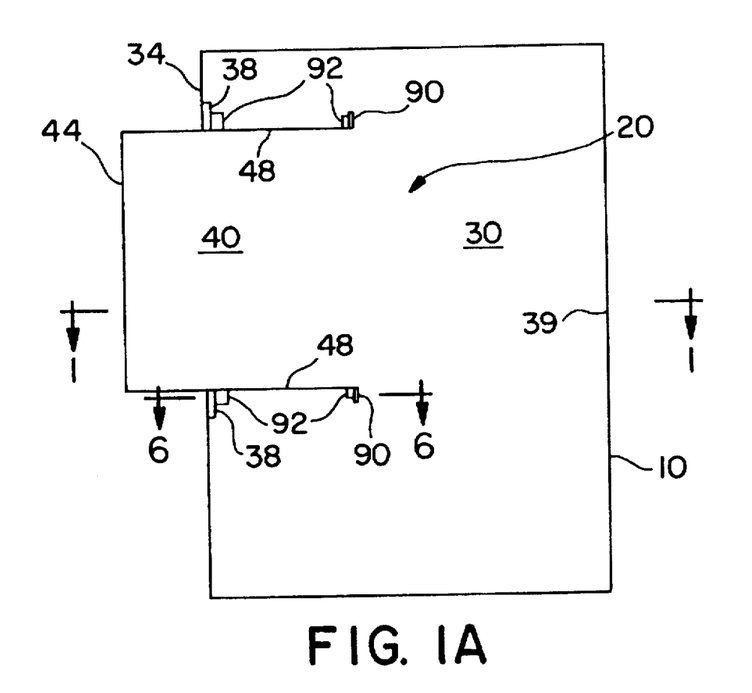
FIG. 1A shows schematically a cross sectional top view as taken along line A—A of FIG. 1.
Figure 6:
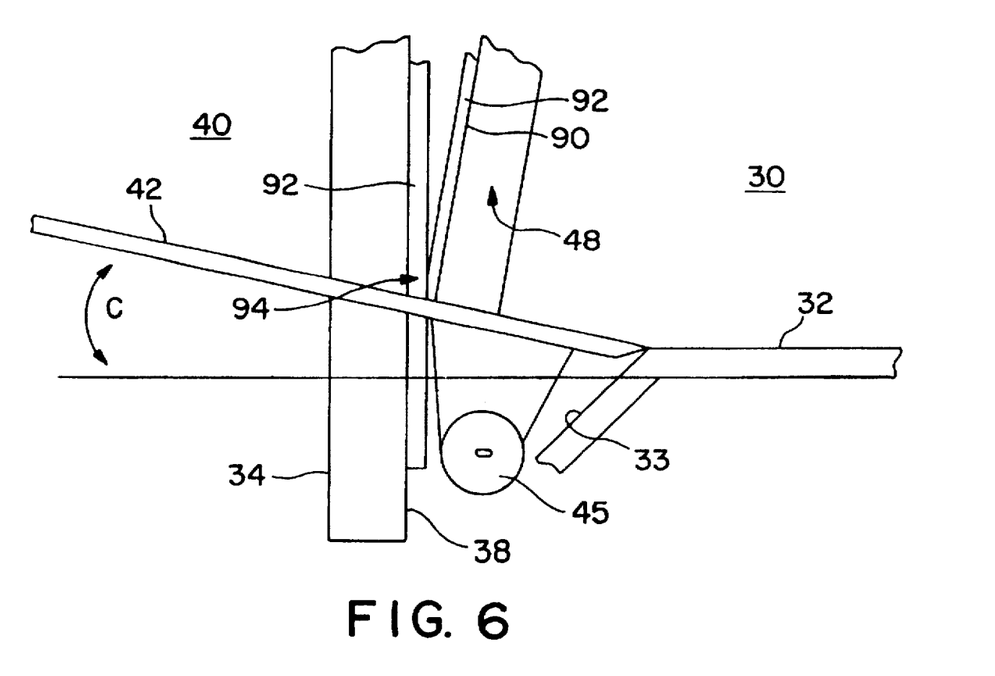
FIG. 6 shows a further enlarged cross sectional front view of the end wall junction of the embodiment of FIG. 2, taken along line 6—6 of FIG. 1A as the end walls are coming together during room expansion.

FIG. 6 shows an enlarged, partial view taken along the vertical plane of line 6—6 of FIG. 1A. Unlike FIG. 1A, in this view the converging end wall sections 38 and 48 are illustrated just as room portion 40 is moving to a fully expanded position. End wall sections 48 each include a stop wall 90 extending outwardly from that room portion. These stop walls serve to engage end walls 38 when room portion 40 is fully expanded and thereby limit the travel of that room portion outwardly from the vehicle. Conventional weather sealing material 92, as in compressible strip form, is placed on the abutting faces of stop walls 90 and/or end wall sections 38. If floor section 42 maintains a slight incline of angle C (that angle being exaggerated in degree in FIG. 6 for ease of viewing) with respect to floor section 32 as roller 45 moves down inclined surface 33, then stop walls 90 will first engage end wall sections 38 only at their lower portions 94. Subsequent pivoting of tube 60 about drive wheel 52 will cause stop walls 90 to pivot through angle C to fully abut end walls 38 and clamp sealing material 90 therebetween without adverse vertical sliding. In this way, weather sealing of the end wall sections can occur in a bottom to top sequence. Thereafter, the operator will typically lock each side of the room structure in an expanded position via the conventional locking devices.

To achieve this combination of results, the components of the present invention and their relative placement are preferably dimensioned such that roller 45 starts to move down inclined surface 33 before wheel 62 starts to move up ramp 56. After the initial movement of roller 45 down inclined surface 33, wheel 62 moves up ramp 56 as roller 45 continues downward, such that some longitudinal and lateral movement of room portion 40 occurs simultaneously. However, the relative angles and length of inclined surface 33 and ramp 56 are preferably established such that at least some pivoting of tube 60 occurs after roller 45 moves off inclined surface 33. Thus, the lateral distance that room portion 40 needs to be lowered in moving to expanded positions can be minimized and the supporting mechanism streamlined for minimal size and weight within a vehicle or other confined space.

Although the present invention has been described above with respect to specific embodiments, the same is by way of illustration and example only and is not to be taken as limitation. Numerous variations of the invention are contemplated in addition to those recited herein without departing from the essential features of this invention.

Figure 7:
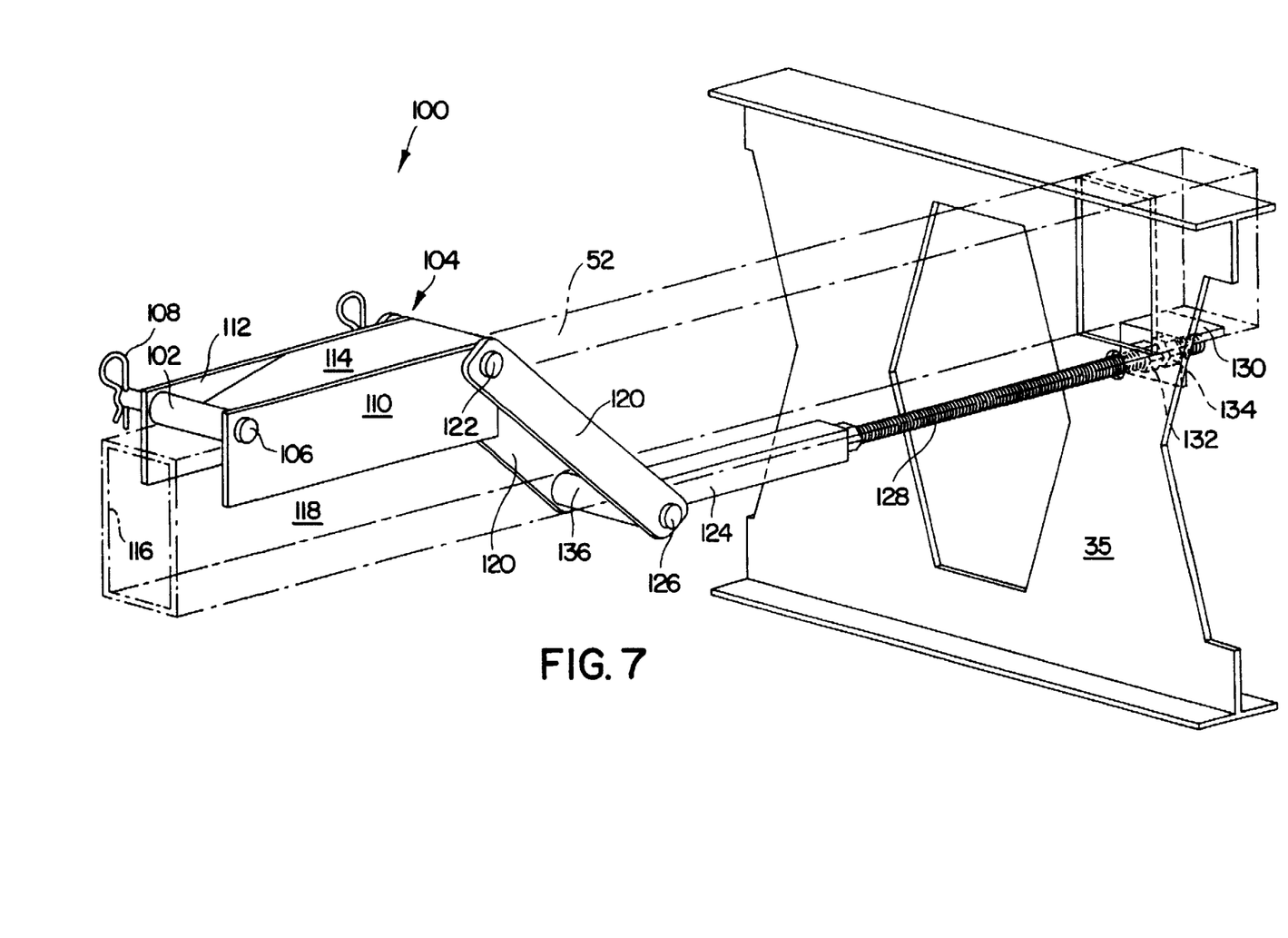
FIG. 7 shows an enlarged, rear perspective view in cross section and phantom of a portion of an alternative lower support structure for an expandable room of the vehicle of FIG. 1.

For example, outer tube 50 can be modified as shown in FIG. 7 to omit ramp 56 (as by cutting it entirely out of the outer tube instead of just being lifted upward in the manner described above) and strap element 58. Instead, an adjustable saddle assembly 100 can be attached to the outer tube to permit the ramp height to be adjustable, thereby varying the drop of the inner tube when the room structure is in expanded positions.

A preferred embodiment of saddle assembly 100 includes roller tube 102 attached, such as by welding, to the end of the cut (formed by the removal of ramp 56) in outer tube 50 which is furthest from drive wheel 52 (not shown in FIG. 7). A saddle ramp 104 is mounted over the cut and pivotably attached to roller tube 102 by pivot pin 106. That pivot pin can be secured in place by any conventional device, such as cotter pin 108. Saddle ramp 104 is preferably formed from spaced apart plates 110 and 112 joined by inclined surface 114. These plates and the inclined surface are, for example, dimensioned such that the plates closely receive the sides 116 and 118 of outer tube 50 below the cut. Surface 114 is inclined upwardly from roller tube 102 and above outer tube 50 (laterally outward therefrom) to the upper edges of plates 110 and 112 and preferably extends the length of the cut.

Figure 7A:
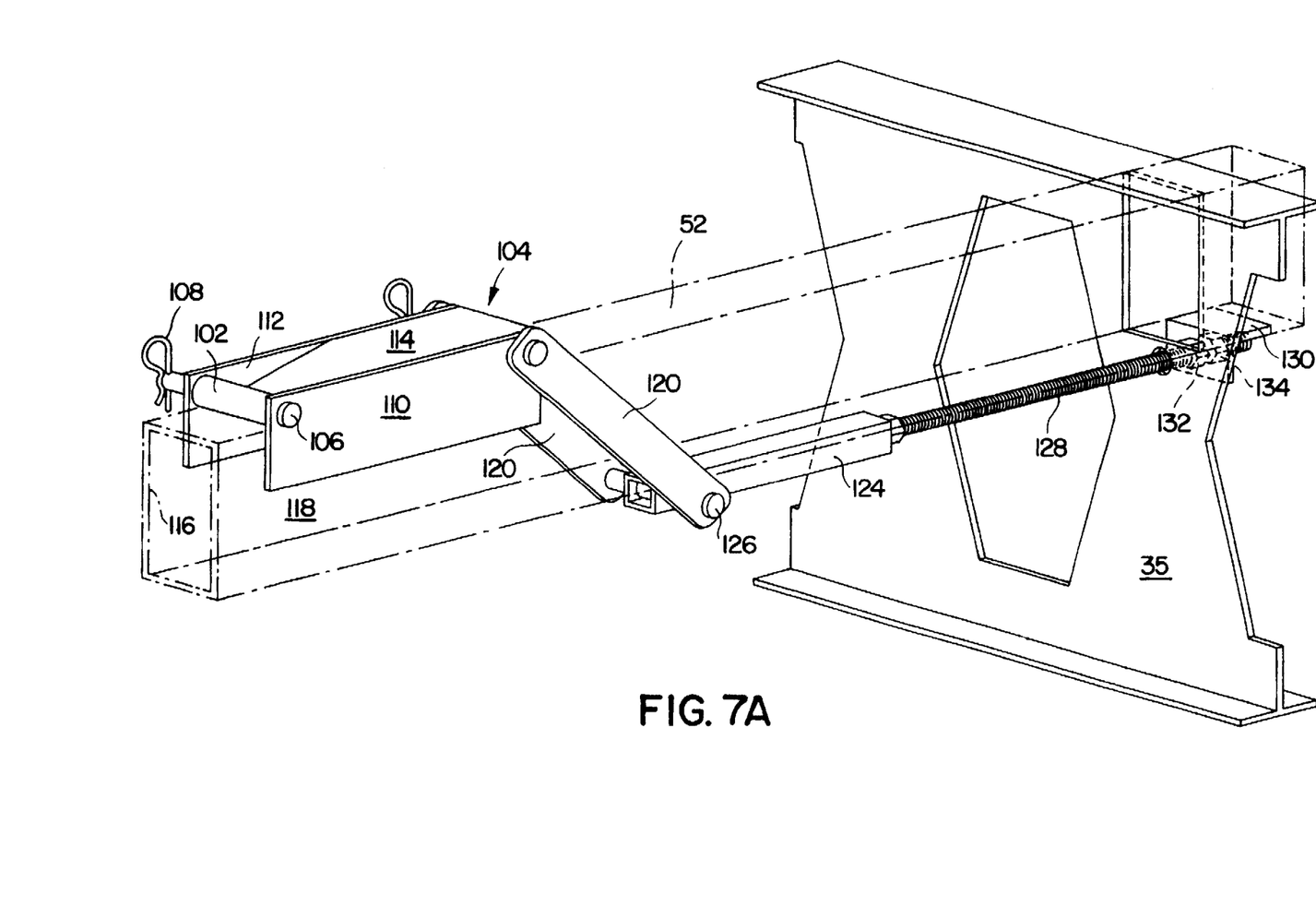
FIG. 7A shows, with the view of FIG. 7, another alternative lower support structure.

The end of saddle ramp 104 furthest from roller tube 102 is pivotably connected to one end of linkage arms 120 by pivot pin 122. Those linkage arms are preferably mounted on either side of outer tube 50 and are pivotably to connected to thrust arm 124 at their other end by pivot pin 126. Thrust arm 124 includes a threaded rod 128 attached thereto which extends along the length of outer tube 50 toward the location of drive wheel 52, preferably through beam structure 35. The end of rod 128 is received in mounting bracket 130 and retained by adjusting nuts 132 and 134. Various equivalent structures are envisioned by the present invention. Pivot pin 126 can, for example, connect linkage arms 120 to thrust arm 124 by passing directly through the thrust arm, as shown in FIG. 7A, by passing through a sleeve 136 which is secured (such as by welding) to the end of the thrust arm, as shown in FIG. 7.

In operation, (assuming conventional right hand threading of rod 128) movement of rod 128 toward saddle ramp 104 can be accomplished by rotation of nut 132 toward bracket 130 with any suitable conventional tool and causes thrust arm 124 to push against linkage arms 120 and raise or elevate the end of surface 114 which is opposite from roller tube 102. Thus, the inclination or slope of the ramp (in place of ramp 56) that wheel 62 travels along when entering the cut changes to be more steep. As will now be readily understood, the opposite effect is achieved by rotation of nut 134 toward bracket 130. In this way, the overall inclination of inner tube 60 (and, thereby, room portion 40) can be adjusted when the room is in expanded positions. Preferably, bracket 130 is located on the underside of the vehicle in a conveniently accessible site at the vehicle side. At the same time, however, surface 114 is restrained against unwanted movement and positively located in its selected position primarily by the embrace of nuts 132 and/or 134 against bracket 130.

Figure 7B:
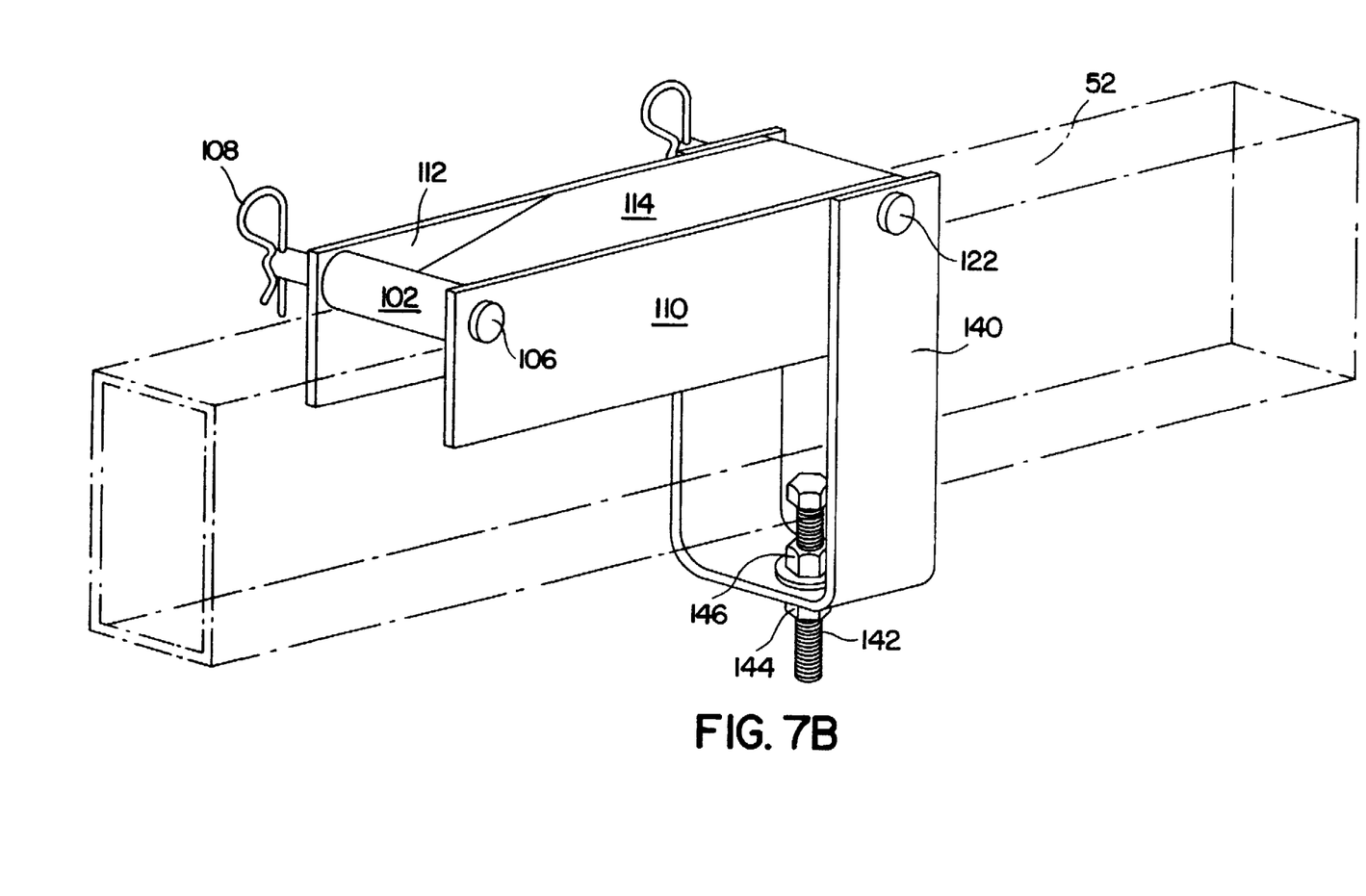
FIG. 7B shows, with a portion of the view of FIG. 7, yet another alternative lower support structure.

Another alternative support structure to provide an adjustable saddle assembly is shown in FIG. 7B, where elements like those discussed above are denoted with like numerals. Instead of connecting to linkage arms 120, pivot pin 122 joins saddle ramp 104 to a U-shaped adjustable saddle bracket 140 that extends under outer tube 50. Threaded bolt 142 is provided to pass through bracket 140 and brace against tube 50 on the side opposite the cut in order to elevate saddle ramp 104. Nuts 144 and 146 are provided to adjust and secure bolt 142 in desired positions.

Figure 8:
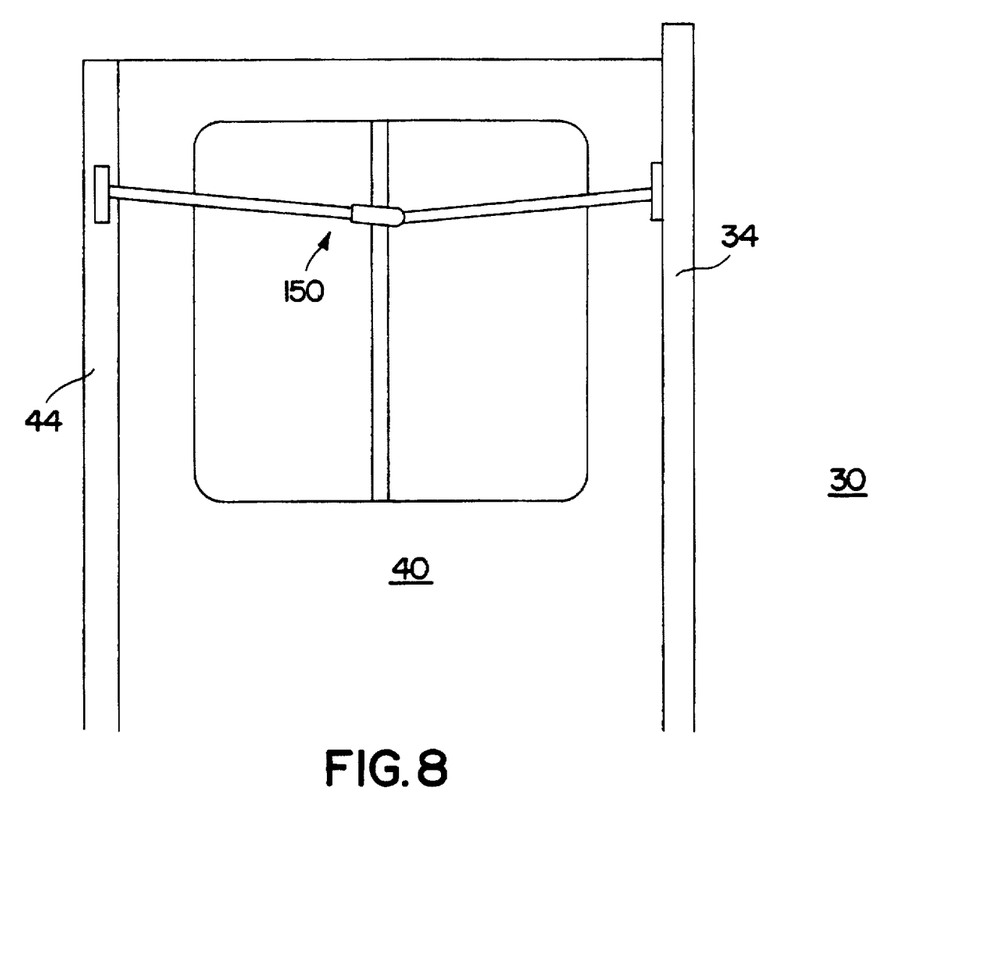
FIG. 8 shows an enlarged, partial front view of the expandable room of the vehicle of FIG. 1 in a fully expanded position with the location of the interior locking device shown in black.
Figure 9:
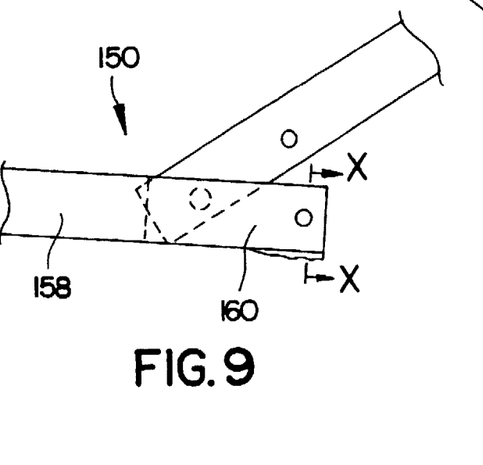
FIG. 9 shows further enlarged side view of an improved locking device for use with the expandable room of the vehicle of FIG. 1.
Figure 10:
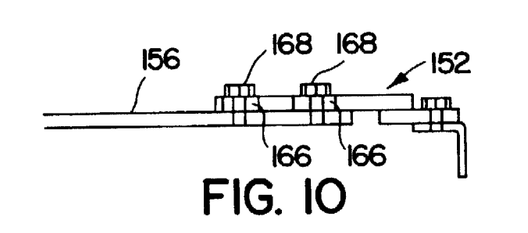
FIG. 10 shows a bottom view of the adjustable bracket portion of the locking device of FIG. 9.
Figure 11:
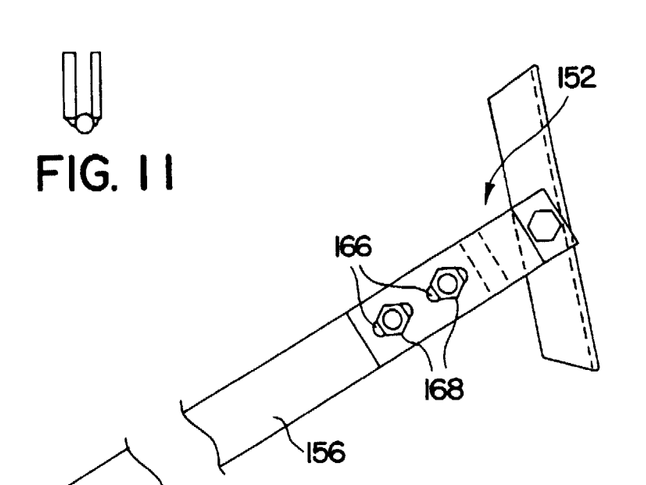
FIG. 11 shows an end view of the lock arm of the locking device of FIG. 10 along line X—X.
Figure 12:
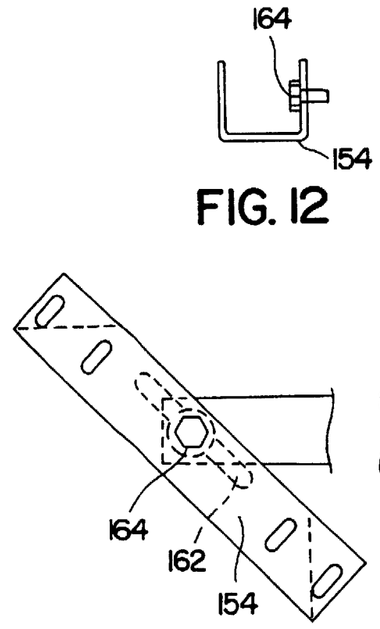
FIG. 12 shows an end view of the slide bracket on the locking device illustrated in FIG. 10.

Also, as shown in FIG. 8, it is preferable to use various accessories with the present invention, such as a locking device, for the purpose described above. One such suitable locking device is that which has previously been used on slideout rooms by Newmar Corporation of Nappannee, Ind. Such locking devices are foldably mounted by brackets on the interior of the vehicle between side wall sections 34 and 44. In the folded position, the arms of the locking device come together and can be fixed in that position by conventional means to resist movement of room portion 40 to expanded positions. In the fully expanded position, as shown in FIG. 8, the arms of the locking device resist further outward movement of room portion 40.

Because of the vertical component of motion of room portion 40 as it moves between expanded and retracted positions, there is some relative vertical motion between the brackets and arms of locking device. It has been found to be advantageous to modify the conventional locking device as shown in FIGS. 9-12. Specifically, locking device 150 includes bracket 152 and bracket 154 connected to ends of arms 156 and 158, respectively. These arms are joined together at their other ends with a lock joint 160. That lock joint is, for example, a U-shaped receptacle on the end of arm 158 which is dimensioned to releasably receive arm 156. That structure is generally known. To adapt this locking device for improved use with the slide out room structure described above, it is preferable to include slot 162 in bracket 154 so that the end of arm 158 can slide along the slot via bolt 164 as room portion 40 moves. Also, adjustment slots 166 are provided in bracket 152 to receive bolts 168 so as to permit a common locking device to accommodate modest variance in the dimensions of different vehicles embodying the present invention. These adaptations can be readily made without significant redesigning of the locking device.

Accordingly, the spirit and scope of the present invention are to be limited only by the terms of the claims below.

What is claimed is:

1. An expandable room structure comprising:
   a first room portion having a first floor,
   a second room portion having a second floor,
   the second room portion being mounted with respect to the first room portion by fixed connection to a telescopically sliding assembly so as to be movable between expanded and retracted positions, and
   the telescopically sliding assembly including a first support element and a second support element mounted for telescopic and lateral movement with respect to the first support element such that the second floor, positioned above the first floor when the second room portion is in a retracted position, becomes flush with the first floor when the second room portion moves to an expanded position.

2. The invention according to claim 1 wherein an adjustment means is connected to the first support element for varying the extent of lateral movement permitted to the second support element.

3. The invention according to claim 2 wherein the adjustment means includes an inclined surface against which the second support elements slides, that inclined surface being laterally movable to selected positions, and including means connected to the inclined surface for retaining the inclined surface in a selected position against unwanted movement.

4. The invention according to claim 2 wherein:
   the first support element is connected to the first floor,
   the second support element is connected to the second floor,
   the second support element is slidably mounted within the first support element,
   a drive wheel is connected to the first support element and engages the second support element to cause sliding of the second support element with respect to the first support element, and
   the adjustment means includes an inclined surface which extends laterally outward from the first support element and is dimensioned to receive an end portion of the second support element and thereby permit the second support element to pivot about the drive wheel as the second support element slides with respect to the first support element.

5. The invention according to claim 4 wherein the inclined surface is pivotably connected to the first support element and an elevating assembly is connected to the inclined surface to selectively control pivotal movement of the inclined surface with respect to the first support element.

6. The invention according to claim 2 wherein the expandable room structure is mounted into a vehicle.

7. An expandable room structure comprising:
   a first room portion having a first floor,
   a second room portion having a second floor,
   the second room portion being mounted with respect to the first room portion by a telescopically sliding assembly so as to be movable between expanded and retracted positions,
   the telescopically sliding assembly including a first support element and a second support element mounted for telescopic and lateral movement with respect to the first support element such that the second floor, positioned above the first floor when the second room portion is in a retracted position, becomes flush with the first floor when the second room portion moves to an expanded position, and
   an adjustment means connected to the first support element for varying the extent of lateral movement permitted to the second support element, that adjustment means including an inclined surface arrangement against which the second support element slides, that inclined surface arrangement being laterally moveable and including means for retaining the inclined surface arrangement in a selected position.

8. The invention according to claim 7 wherein the inclined surface arrangement is pivotally mounted with respect to the first support element and includes an elevating means to selectively control pivotal movement of the inclined surface arrangement.

* * * * *